US012461989B2

(12) United States Patent
Pammer et al.

(10) Patent No.: US 12,461,989 B2
(45) Date of Patent: Nov. 4, 2025

(54) CORRECTING LOW-RESOLUTION MEASUREMENTS

(71) Applicant: Minitab, LLC, State College, PA (US)

(72) Inventors: Cheryl L. Pammer, San Diego, CA (US); Robert E. Kelly, State College, PA (US)

(73) Assignee: Minitab, LLC, State College, PA (US)

( * ) Notice: Subject to any disclaimer, the term of this patent is extended or adjusted under 35 U.S.C. 154(b) by 991 days.

(21) Appl. No.: 17/531,206

(22) Filed: Nov. 19, 2021

(65) Prior Publication Data

US 2023/0161837 A1    May 25, 2023

(51) Int. Cl.
*G06F 17/18* (2006.01)
(52) U.S. Cl.
CPC .................................. *G06F 17/18* (2013.01)
(58) Field of Classification Search
CPC ...................................................... G06F 17/18
USPC .......................................................... 706/12
See application file for complete search history.

(56) References Cited

U.S. PATENT DOCUMENTS

| | | | |
|---|---|---|---|
| 2005/0187743 A1* | 8/2005 | Pleasant | G06F 30/367 703/2 |
| 2007/0268997 A1* | 11/2007 | Zhu | A61B 6/5282 378/7 |
| 2014/0177845 A1* | 6/2014 | Patwardhan | G10L 19/02 381/17 |
| 2017/0168285 A1* | 6/2017 | Ozcan | G02B 21/0056 |
| 2018/0204051 A1* | 7/2018 | Li | G06V 10/764 |
| 2019/0156151 A1* | 5/2019 | Wrenninge | G06F 18/214 |
| 2023/0137205 A1* | 5/2023 | Fu | G06N 3/044 711/133 |

FOREIGN PATENT DOCUMENTS

CN            104885187 A   *   9/2015   ........... G02B 21/365

* cited by examiner

*Primary Examiner* — Austin Hicks

(57) ABSTRACT

Methods and systems to correct low-resolution measurements corresponding to unobservable high-resolution measurements by introducing variation in the plurality of low-resolution measurements through iteratively computing, until a termination criteria is met, perturbed values for the low-resolution measurements. The perturbed values have a higher resolution than another resolution of the low-resolution measurements. A distribution test may afterwards be performed on the perturbed values that remain after the termination criteria is met.

19 Claims, 17 Drawing Sheets

CORRECTING LOW-RESOLUTION MEASUREMENTS

TECHNICAL FIELD

The present invention relates generally to a method, system, and computer program product for correcting measurements. More particularly, the present invention relates to a method, system, and computer program product for correcting and testing the normality of a plurality of measurements having low resolution.

BACKGROUND

Organizations may gather and examine information from a number of sources to obtain a complete and accurate picture of a subject. Obtaining the information may allow the organization to answer pertinent questions, assess outcomes, conduct research and forecast future probability and trends.

Maintaining the integrity of research, making educated business decisions, and assuring product/device quality may all be bolstered by accurate data collecting.

SUMMARY

In one aspect, a method is disclosed. The method may include receiving a plurality of low-resolution measurements, the plurality of low-resolution measurements corresponding to a plurality of unobservable high-resolution measurements. Variation may be introduced in the plurality of low-resolution measurements by iteratively computing, until a termination criteria is met, corresponding perturbed values for the low-resolution measurements. The corresponding perturbed values may have a higher resolution than another resolution of the low-resolution measurements. A distribution test may then be run on final perturbed values that remain after said termination criteria is met.

The method may also include performing the variation introduction by computing, for each low-resolution measurement, a first interval that contains a corresponding unobservable high-resolution measurement corresponding to said each low-resolution measurement. A random observation may be generated, for each low-resolution measurement, from a uniform distribution on a defined interval. Each random observation may be transformed to be uniform on a second interval that corresponds to a distribution function such as a cumulative distribution function of the first interval to obtain corresponding rescaled uniform observations. The cumulative distribution function may be based on distribution parameters such as mean and standard deviation of said low-resolution measurements. Responsive to the transforming, and using an inverse of the distribution function, said rescaled uniform observations may be inverse transformed to obtain the corresponding perturbed values. In particular, the transforming and the inverse transforming may be repeated iteratively using new distribution parameters of the corresponding perturbed values until said termination criteria is met. The distribution test may be an Anderson-Darling test. The Anderson-Darling test may test for normality or for non-normality. However other tests such as other empirical distribution function (EDF) statistics tests may be used.

In another aspect, a non-transitory computer readable storage medium is disclosed. The non-transitory computer readable storage medium stored program instructions which, when executed by a processor, causes the processor to perform a procedure that includes receiving a plurality of low-resolution measurements, the plurality of low-resolution measurements corresponding to a plurality of unobservable high-resolution measurements, introducing variation in the plurality of low-resolution measurements by iteratively computing, until a termination criteria is met, corresponding perturbed values for the low-resolution measurements, said corresponding perturbed values having a higher resolution than another resolution of the low-resolution measurements, and running, responsive to the introducing, a distribution test on final perturbed values that remain after said termination criteria is met.

In yet another aspect, a computer system is disclosed. The computer system includes at least one processor configured to perform the steps of receiving a plurality of low-resolution measurements, the plurality of low-resolution measurements corresponding to a plurality of unobservable high-resolution measurements, introducing variation in the plurality of low-resolution measurements by iteratively computing, until a termination criteria is met, corresponding perturbed values for the low-resolution measurements, said corresponding perturbed values having a higher resolution than another resolution of the low-resolution measurements, and running, responsive to the introducing, a distribution test on final perturbed values that remain after said termination criteria is met.

Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
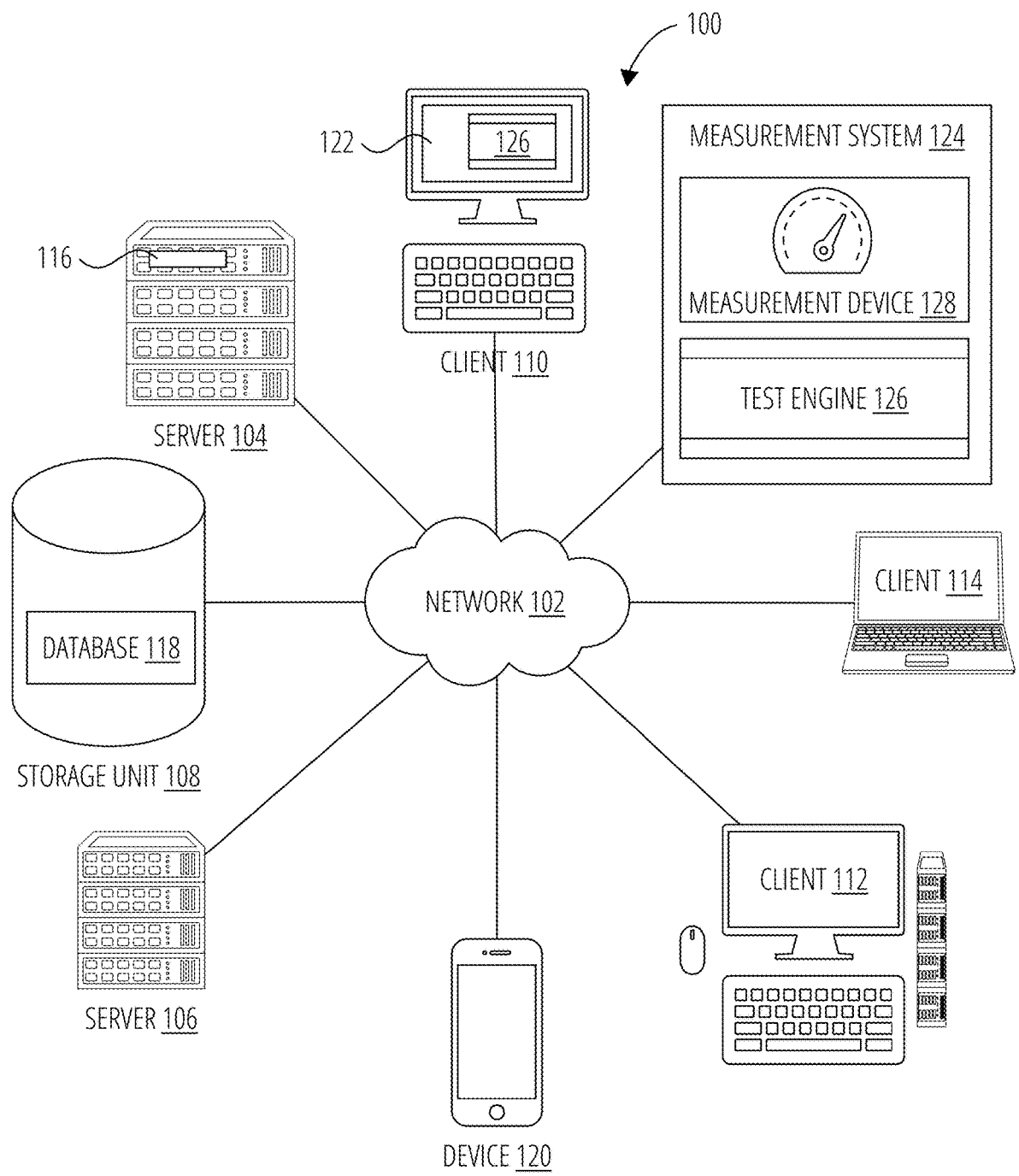
FIG. 1 depicts a block diagram of a network of data processing systems in which illustrative embodiments may be implemented.

The illustrative embodiments recognize that there is a need to improve the accuracy of measurements and data in general for further examination or research. For example, some statistical techniques may require selecting an appropriate distribution for a plurality of data/measurements. The illustrative embodiments recognize that while distribution tests for continuous distributions may assume that sample data are truly continuous, measurement devices may inherently have a resolution limit that may effectively round these measurements and create ties in the data. For example, a sample dataset that may theoretically take any real value over a range of positive numbers, may be obtained from measurements that are retrieved only to the nearest 10, such that the sample may have only a few distinct values, say {30, 40, 50, 60, 70, 80}. While the data measured to greater precision using higher precision measurement devices may follow a normal distribution, a test of these relatively low-resolution data may erroneously reject a hypothesis that they follow a normal distribution. This may be observed in many practices including, for example, the estimation of process capability statistics, demonstration that a product, such as a medical device, meets a specific reliability requirement, such as 95/95 confidence and reliability, and prediction of future warranty claims and the costs associated with them. Further, a manufacturer or researcher may need to show that a set of data is compatible with a normal distribution (or some other specific type of distribution). However, the variation in the data may be small relative to the measurement device, e.g., it may give measurements rounded to the nearest integer or tenth of an integer. A test of normality such as the Anderson-Darling test will tend to reject the hypothesis of normality too often if the data are rounded too much. Presently available systems may be limited to employing higher resolution measurement devices to repeat measurements and worse, may not even recognize the insufficiency of the resolution of devices used leading to false rejections of distribution assumptions under a given hypothesis. Such a manner of distribution testing is error-prone, time consuming and costly particularly if measurements have to be repeated. Further, such a manner of distribution testing may be especially prohibitive for applications involving sensitive data, such as the testing of medical devices wherein false rejections may be misleading and even damaging. The illustrative embodiments recognize that this has been a significant and complex pain-point in the industry which has hitherto been unresolved with any viable systems and processes let alone systems and processes that are applicable across many distributions, and practical situations. Additionally, when it is not possible to substantiate the use of a specific distribution, such as the normal distribution, a distribution-free approach may be necessary. Such nonparametric approaches may require much larger sample sizes, which may be cost prohibitive, particularly when the nature of the measurement is destructive to the part.

The illustrative embodiments described herein generally relate to adjusting for the erroneous rounding or truncation of data/measurements by perturbing the data at each value over a relatively wider interval and applying a defined distribution testing to the perturbed data. By this unconventional approach, the measurements may more closely represent what a random sample from the corresponding population may look like.

Distribution testing may be used to evaluate data distribution and to test data for normality. Many statistical tests may be parametric (i.e., the tests may assume that the data follows a specific distribution, has a defined shape, and can be described by a few parameters, such as a mean and a standard deviation. Some data distributions include the normal distribution, (also known as the bell curve) and distributions that can be transformed to a normal distribution (such as a lognormal distribution). In addition, non-normal distributions, such as the gamma and Weibull distributions are available. For a normal distribution, most of the data concentrations may be near the mean, or average value and the likelihood of obtaining values away from the mean in either direction may taper off the further the concentration is from the mean. Further, an Anderson-Darling statistic may be used to assess how closely data/measurements adhere to a certain distribution. The smaller this statistic is for a given data set and distribution, the better the distribution fits the data. The Anderson-Darling statistic, may for example, be used to determine if data fits the normality assumption for a T-test. A null hypothesis (Ho) for the Anderson-Darling test hypotheses may be: The data follows a normal distribution, whereas an alternative hypothesis (H1) for the Anderson-Darling test may be: The data does not follow a normal distribution. To determine if the data follows the normal distribution, an appropriate p-value may be used. If the p-value is less than a predetermined alpha (typically 0.05 or 0.10), the null hypothesis that the data is from a normal distribution may be rejected.

However, though the benefits of the distribution testing may be limited by the resolution of the data, presently available systems do not address these needs or provide adequate solutions. The illustrative embodiments therefore recognize that by strategically reintroducing variation into the data/measurements, false rejections of the distribution assumptions may occur at the stated type I error rate, or alpha as described hereinafter.

An embodiment can be implemented as a software and/or hardware application. The application implementing an embodiment can be configured as a modification of an existing system, as a separate application that operates in conjunction with an existing system, a standalone application, or some combination thereof.

Particularly, some illustrative embodiments provide a method that obtains a plurality of low-resolution measurements for a test system, the plurality of low-resolution measurements corresponding to a plurality of unobservable high-resolution measurement values. The method introduces variation, in the plurality of low-resolution measurements by iteratively computing, until a stability criteria is met, perturbed values for the low-resolution measurements, said perturbed values having a higher resolution than another resolution of the low-resolution measurements. Responsive to the computing, the method runs a distribution test on the perturbed data. In the method each low-resolution data may have a corresponding perturbed data value.

In another embodiment, the method obtains the set of low-resolution measurements by measuring the values of a property, using a low-resolution measurement device. The values may be quantitative values of the property and the low-resolution measurement device may round, truncate or generally imprecisely and/or inaccurately obtain measurement data, based on, for example, a low quality of said low-resolution measurement device.

This manner of correcting low-resolution measurements and distribution testing is unavailable in the presently available methods in the technological field of endeavor pertaining to statistical and predictive analytical platforms. A method of an embodiment described herein, when implemented to execute on a device or data processing system, comprises substantial advancement of the computational functionality of that device or data processing system in configuring the performance of a predictive analytic platform.

The illustrative embodiments are described with respect to certain types of machines developing statistical and predictive analytic models based on data records obtained from low-resolution measurements or data. The illustrative embodiments are also described with respect to other scenes, subjects, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific surveys, code, hardware, algorithms, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
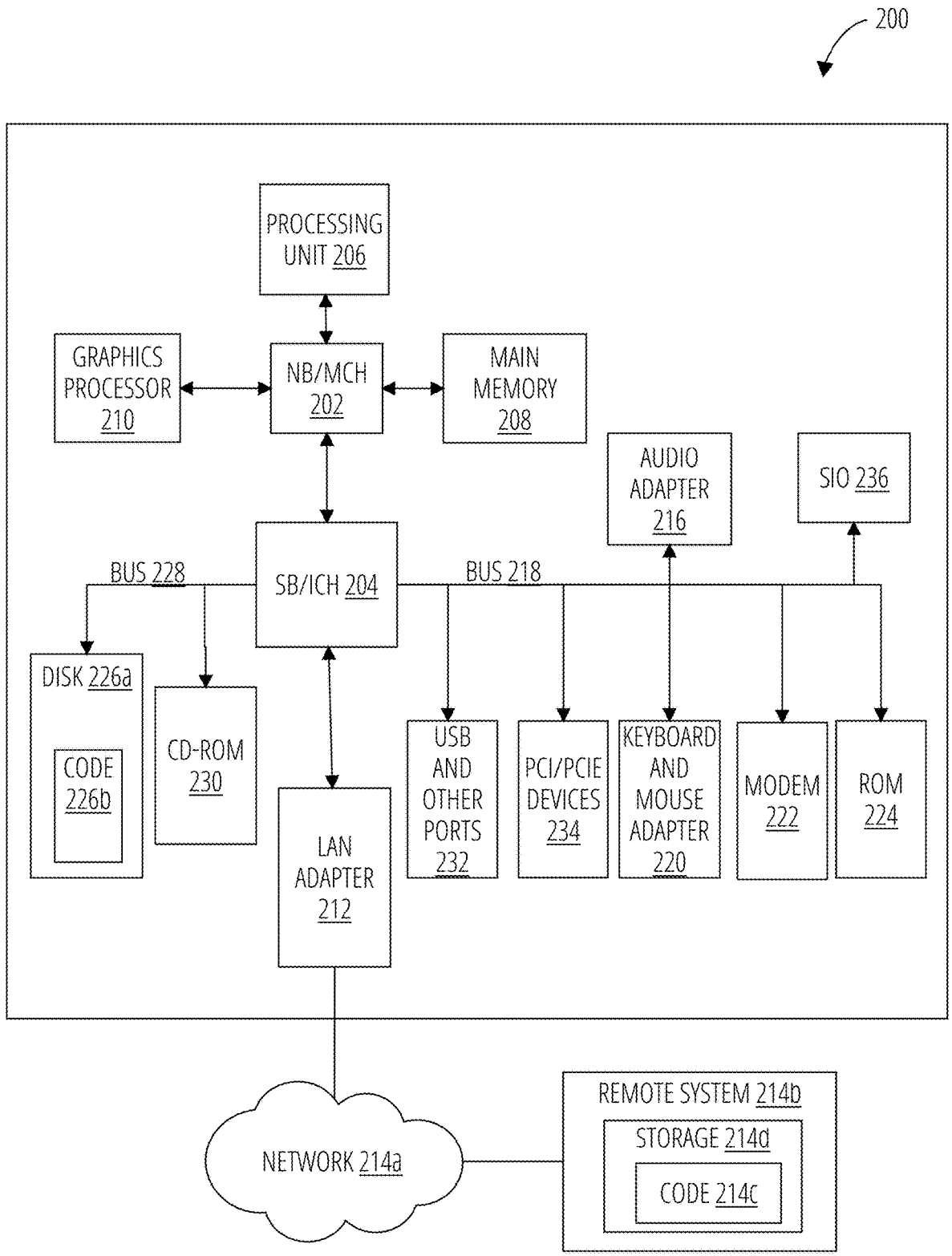
FIG. 2 depicts a block diagram of a data processing system in which illustrative embodiments may be implemented.

With reference to the figures and in particular with reference to FIG. 1 and FIG. 2, these figures are example diagrams of data processing environments in which illustrative embodiments may be implemented. FIG. 1 and FIG. 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Client 110, client 112, client 114 are also coupled to network 102. A data processing system, such as server 104 or server 106, or clients (client 110, client 112, client 114) may contain data and may have software applications or software tools executing thereon. Server 104 may include one or more GPUs (graphics processing units) for training one or more models.

Only as an example, and without implying any limitation to such architecture, FIG. 1 depicts certain components that are usable in an example implementation of an embodiment. For example, servers and clients are only examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems (server 104, server 106, client 110, client 112, client 114) also represent example nodes in a cluster, partitions, and other configurations suitable for implementing an embodiment.

Device 120 is an example of a device described herein. For example, device 120 can take the form of a smartphone, a tablet computer, a laptop computer, client 110 in a stationary or a portable form, a wearable computing device, or any other suitable device. Any software application described as executing in another data processing system in FIG. 1 can be configured to execute in device 120 in a similar manner. Any data or information stored or produced in another data processing system in FIG. 1 can be configured to be stored or produced in device 120 in a similar manner.

Test engine 126 may execute as part of client application 122, server application 116 or on any data processing system herein. Test engine 126 may also execute as a cloud service communicatively coupled to system services, hardware resources, or software elements described herein. Database 118 of storage unit 108 stores one or more measurements or data in repositories for computations herein.

Server application 116 implements an embodiment described herein. Server application 116 can use data from storage unit 108 for low-resolution data correction and testing. Server application 116 can also obtain data from any client for correction and testing. Server application 116 can also execute in any of data processing systems (server 104 or server 106, client 110, client 112, client 114), such as client application 122 in client 110 and need not execute in the same system as server 104.

Server 104, server 106, storage unit 108, client 110, client 112, client 114, device 120 may couple to network 102 using wired connections, wireless communication protocols, or other suitable data connectivity. Client 110, client 112 and client 114 may be, for example, personal computers or network computers.

In the depicted example, server 104 may provide data, such as boot files, operating system images, and applications to client 110, client 112, and client 114. Client 110, client 112 and client 114 may be clients to server 104 in this example. Client 110, client 112 and client 114 or some combination thereof, may include their own data, boot files, operating system images, and applications. Data processing environment 100 may include additional servers, clients, and other devices that are not shown. Server 104 includes a server application 116 that may be configured to implement one or more of the functions described herein for low-resolution measurement correction in accordance with one or more embodiments.

Server 106 may include a search engine configured to search measurements or databases in response to a query with respect to various embodiments. The data processing environment 100 may also include a dedicated measurement system 124 which comprises a test engine 126. The dedicated measurement system 124 may be used for performing measurements of defined properties, via special purpose measurement devices 128 such as medical devices, vision and imaging devices, detectors, transducers, sensors instruments used in measuring physical quantities and attributes of real-world objects and events. The dedicated measurement system 124 may also be used to test samples using the test engine 126. The measurement system 124 may make decisions about the distributions measurements belong to by performing distribution testing to measurements responsive to performing perturbations on low-resolution measurements. For example, it may apply an Anderson-Darling test to the measurements modified by perturbation techniques described herein, which may result in data having ideal statistical properties.

An operator of the measurement system 124 can include individuals, computer applications, and electronic devices. The operators may employ the test engine 126 of the measurement system 124 to make predictions or decisions. An operator may desire that the test engine 126 perform methods to satisfy a predetermined evaluation criteria. Thus, a new and unique way to perturb data to address rounding and similar measurement issues that is effective, statistically appropriate and much more accurate than using the Anderson-Darling statistic and p-values on the raw, unadjusted data may be provided.

The data processing environment 100 may also be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as server 104, server 106, or client 110, client 112, client 114, measurement system 124 in FIG. 1, or another type of device in which computer usable program code or instructions implementing the processes may be located for the illustrative embodiments.

Data processing system 200 is also representative of a data processing system or a configuration therein, such as device 120 in FIG. 1 in which computer usable program code or instructions implementing the processes of the illustrative embodiments may be located. Data processing system 200 is described as a computer only as an example, without being limited thereto. Implementations in the form of other devices, such as device 120 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to North Bridge and memory controller hub (NB/MCH) 202 through an accelerated graphics port (AGP) in certain implementations.

In the depicted example, local area network (LAN) adapter 212 is coupled to South Bridge and input/output (I/O) controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and input/output (I/O) controller hub (SB/ICH) 204 through bus 218. Hard disk drive (HDD) or solid-state drive (SSD) 226a and CD-ROM 230 are coupled to South Bridge and input/output (I/O) controller hub (SB/ICH) 204 through bus 228. PCI/PCIe devices 234 may include, for example, Ethernet adapters, add-in cards, and PC cards for notebook computers. PCI uses a card bus controller, while PCIe does not. Read only memory (ROM) 224 may be, for example, a flash binary input/output system (BIOS). Hard disk drive (HDD) or solid-state drive (SSD) 226a and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and input/output (I/O) controller hub (SB/ICH) 204 through bus 218.

Memories, such as main memory 208, read only memory (ROM) 224, or flash memory (not shown), are some examples of computer usable storage devices. Hard disk drive (HDD) or solid-state drive (SSD) 226a, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as server application 116 and client application 122 in FIG. 1, are located on storage devices, such as in the form of codes 226b on Hard disk drive (HDD) or solid-state drive (SSD) 226a, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory (ROM) 224, or in one or more peripheral devices.

Furthermore, in one case, code 226b may be downloaded over network 214a from remote system 214b, where similar code 214c is stored on a storage device 214d in another case, code 226b may be downloaded over network 214a to remote system 214b, where downloaded code 214c is stored on a storage device 214d.

The hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub (NB/MCH) 202. A processing unit may include one or more processors or CPUs.

The depicted examples in FIG. 1 and FIG. 2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and Hard disk drive (HDD) or solid-state drive (SSD) 226a is manifested as a virtualized instance of all or some portion of Hard disk drive (HDD) or solid-state drive (SSD) 226a that may be available in the host data processing system. The host data processing system in such cases is represented by data processing system 200.

Figure 3:
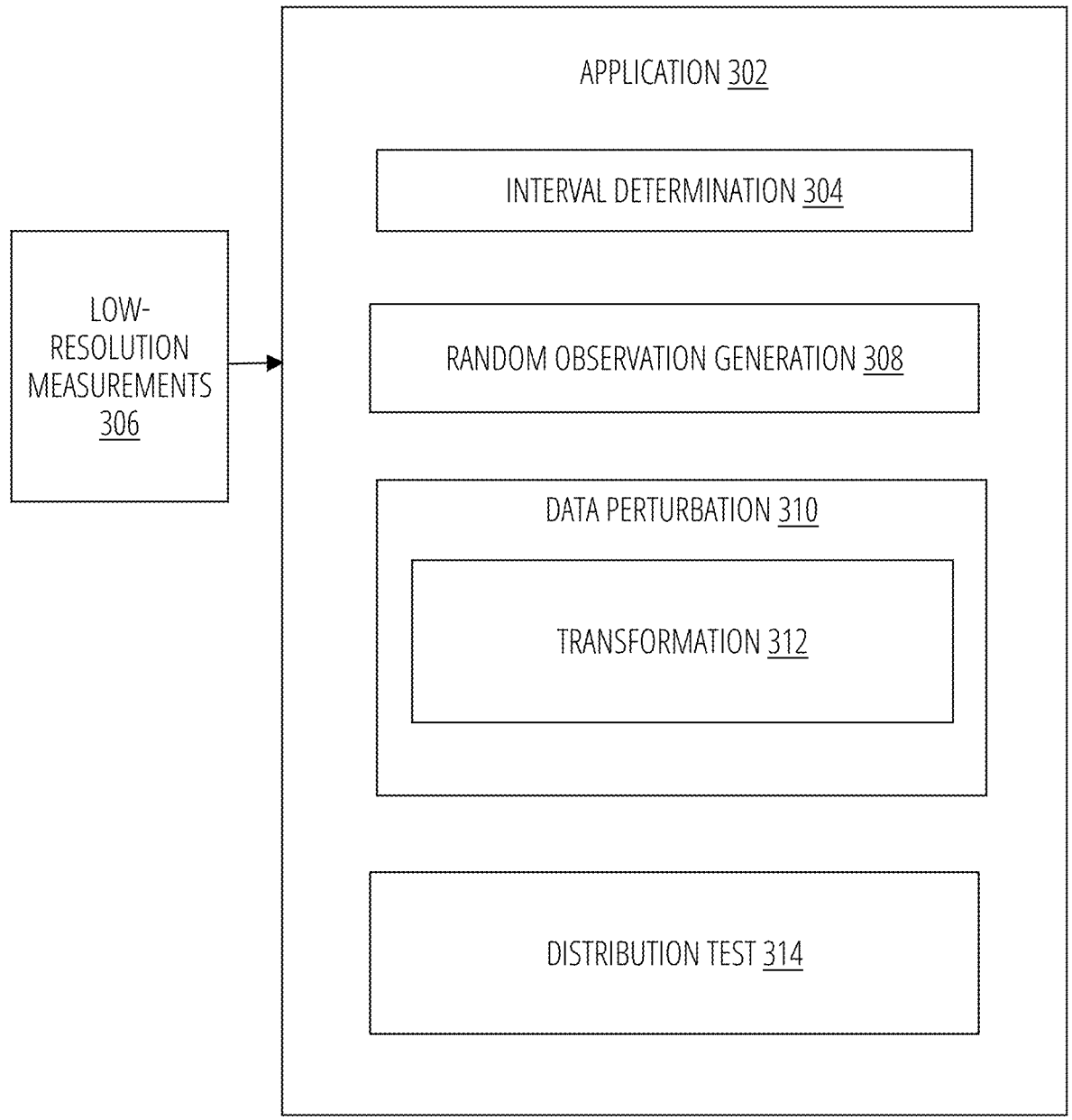
FIG. 3 depicts a block diagram of an application in which illustrative embodiments may be implemented.

With reference to FIG. 3, this figure depicts a block diagram of an example configuration for correcting and testing low-resolution measurements. The example embodiment includes application 302. In a particular embodiment, application 302 is an example of client application 122 or server application 116 of FIG. 1.

Application 302 receives a set or plurality of low-resolution measurements 306 for a test system. In a particular embodiment, the low-resolution measurements 306 represents quantitative measurements obtained by an operator using one or more measurement devices 128. For example, the measurements/data may be obtained from manufacturer testing such as ISO (International Organization for Standardization) testing of balloon rated burst pressures, which may enable catheter manufacturers determine a rated burst pressure (RBP)—the pressure at which 99.9% of balloons can survive with 95% confidence. Further, a pin gage is a steel pin used to quickly measure the diameter of a drilled hole in metal or other material. Pin gages come in sets containing various sized pins. When measuring hole size, the diameter of the largest pin that will fit is recorded as the diameter of the hole. A pin gage measuring system may have poor resolution because of the relatively large differences in pin gage diameter from one size gage to the next. Even further, food, beverage, pharmaceutical and medical device manufacturers may have to carefully seal their product packaging to strict specifications so the product remains safe for consumption. If the seal is too weak, the packaging may open during shipment. If the seal is too strong, a consumer may have difficulty opening the packaging. Seal strength is the maximum force needed to separate the two layers of a seal under particular conditions. Seal strength may be rounded to the nearest Newton per square millimeters, causing low resolution in the measurements which may make it difficult to assess the true process capability. In another example, air quality meters, designed to measure air velocity, pressure, gases, temperature, humidity, dust etc. may be used may be used to obtain measurements which may be of low-resolution. Of course, these examples are not meant to be limiting as measurements from any continuous distribution may be included.

In the embodiment, interval determination component 304 may be configured to determine, based on a resolution of the low-resolution measurements, a first interval known to contain an unobservable high-resolution measurement value that corresponds to a low-resolution measurement value. This may be performed for all low-resolution measurement values in a data set. Random observation generation component 308 may generate, for each low-resolution measurement value, random observations from a uniform distribution on an interval (0,1). Data perturbation component 310 may transform, using the transformation component 312, the random observations to be uniform on a second interval that is based on a cumulative distribution function of the normal distribution (or of another distribution being tested) to obtain rescaled uniform observations. The rescaled uniform observations may be transformed back using the inverse cumulative distribution function to obtain perturbed values. This may be repeated under new statistics until a termination criteria is achieved as described hereinafter. Further, the distribution test component 314 may perform a test of whether the perturbed values follow a predefined distribution responsive to obtaining final perturbed values.

Figure 4:
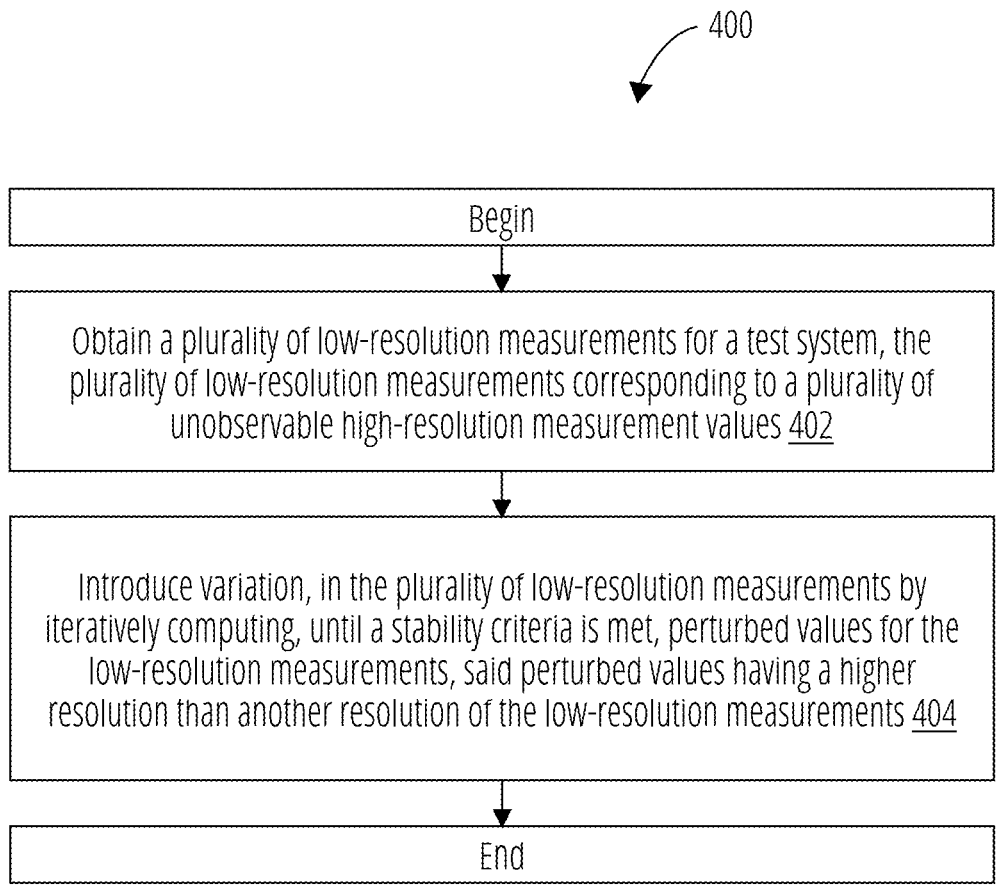
FIG. 4 depicts a method in which illustrative embodiments may be implemented.

FIG. 4 illustrates a process 400 in which illustrative embodiments may be implemented. The process begins in step 402, wherein process 400 obtains a plurality of low-resolution measurements for a test system, the plurality of low-resolution measurements corresponding to a plurality of unobservable high-resolution measurement values. In step 404, process 400 introduces variation, in the plurality of low-resolution measurements by iteratively computing, until a stability criteria is met, perturbed values for the low-resolution measurements, the perturbed values having a higher resolution than another resolution of the low-resolution measurements. Responsive to final perturbed values being computed, the process may perform a distribution test on the final perturbed data.

Figure 5:
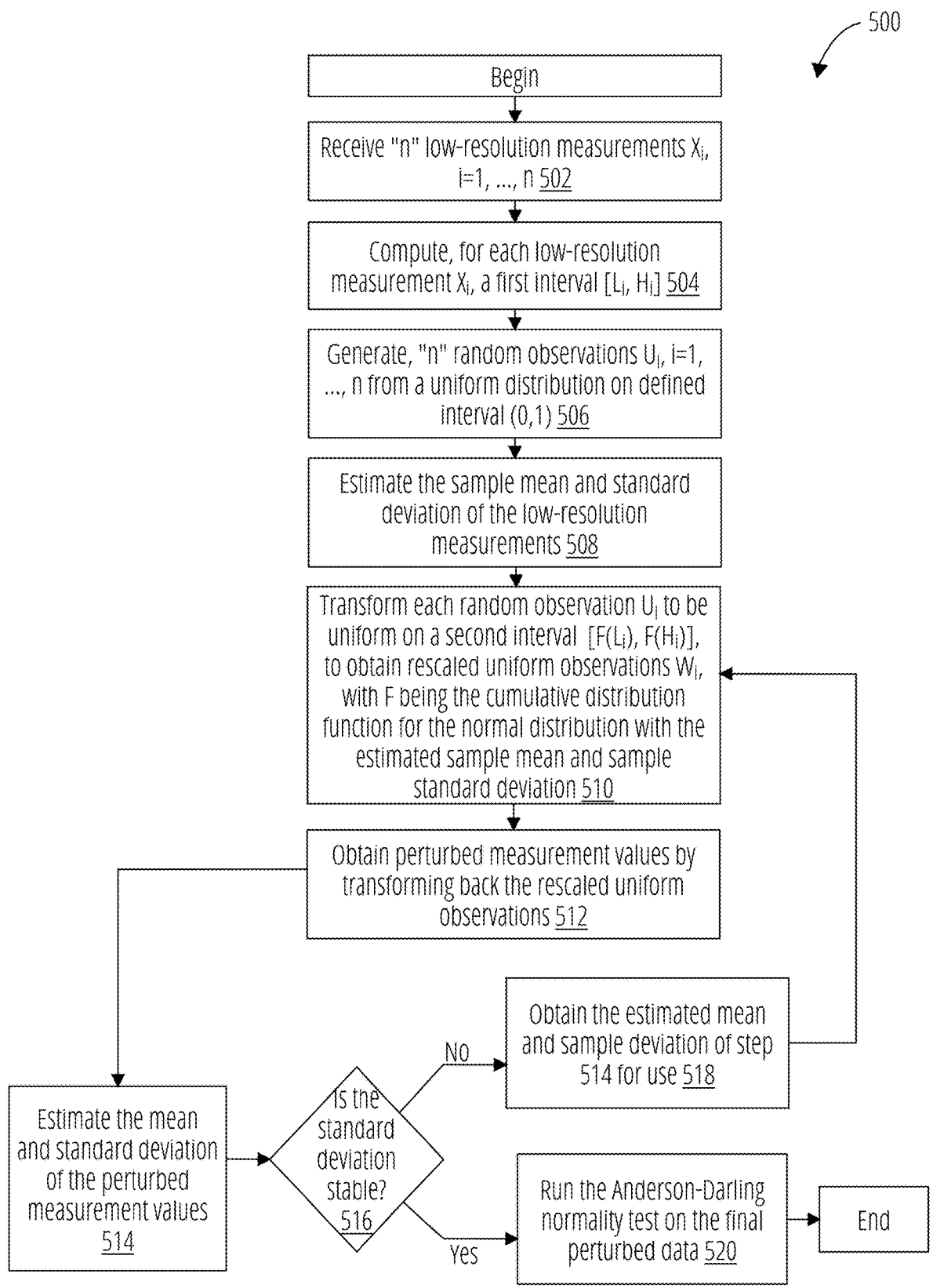
FIG. 5 depicts a method in which illustrative embodiments may be implemented.

FIG. 5 illustrates a specific example process 500 the process 400 of FIG. 4. The process 500 may begin at step 502, wherein process 500 receives a plurality of low-resolution measurements, the plurality of low-resolution measurements corresponding to a plurality of unobservable high-resolution measurements ($\widehat{X_i}$, i=1, ..., n). In an example, "n" number of low-resolution measurements $X_i$, i=1, ..., n may be received. In step 504, process 500 computes, for each low-resolution measurement, a first interval [$L_i$, $H_i$] that contains a corresponding unobservable high-resolution measurement corresponding to said each low-resolution measurement value. The first interval may be based on the range of possible values of the unobservable high-resolution data that would have been rounded to each observed low-resolution value. E.g. if a low-resolution value 13 is observed, the interval may be 12.5 to 13.5. For a situation where the low-resolution measurements are a rounded version of the unobservable high-resolution measurement, i.e.
where $$X_i = \Delta \text{ Round}\left(\frac{\widehat{X_i}}{\Delta}\right), i = 1, ..., n$$

the first interval [$L_i$, $H_i$] may be obtained as shown:

$$[L_i, H_i] = \left[X - \frac{\Delta}{2}, X + \frac{\Delta}{2}\right]$$

In step 506, process 500 generates, for each low-resolution measurement, a random observation from a uniform distribution on a defined interval (0,1). Thus, step 506 may generate "n" random observations $U_i$, i=1, ..., n. In step 508, process 500 may estimate the distribution parameters (e.g., mean and standard deviation for the normal distribution and thus sample mean ($\hat{\mu}$) and sample standard deviation ($\hat{\sigma}$) for initial estimates) of the low-resolution measurements. Said sample mean ($\hat{\mu}$) and sample standard deviation ($\hat{\sigma}$) may be estimated as follows:

$$\hat{\mu} = \frac{1}{n}\sum_{i=1}^{n} X_i$$

$$\hat{\sigma} = \sqrt{\frac{\sum_{i=1}^{n}(X_i - \hat{\mu})^2}{n-1}}$$

In step 510, the process 500 may transform each random observation $U_i$ to be uniform on a second interval [$F(L_i)$, $F(H_i)$], to obtain rescaled uniform observations $W_i$, with F being the cumulative distribution function for the normal distribution with the estimated distribution parameters (estimated sample mean and estimated sample standard deviation).

The rescaled uniform observations $W_i$ may be computed as follows:

$$W_i = \hat{F}(L_i) + (\hat{F}(H_i) - \hat{F}(L_i))U_i$$

For a normal distribution, the estimated cumulative distribution function may be estimated as follows, with $\phi$ denoting the cumulative distribution function of the standard normal distribution:

$$\hat{F}(x) = \Phi\left(\frac{x - \hat{\mu}}{\hat{\sigma}}\right)$$

In step 512, process 500 obtains perturbed values ($\widehat{X_i}$, i=1, ..., n) by inverse transforming the rescaled uniform observations $W_i$, responsive to the transforming step of step 510 and using an inverse of the cumulative distribution function.

$$\hat{X}_i = \hat{F}^{-1}(W_i).$$

In step 514, process 500 may estimate distribution parameters (e.g., the mean and standard deviation in the case of a normal distribution) of the perturbed values. In step 516, process 500 may determine if an evaluation/termination criteria condition is met. The termination criteria condition may be whether the standard deviation is stable. Responsive to determining that the termination criteria condition is not met, process 500 obtains the estimates of step 514 for use, in step 518). In other words, updated estimates of the parameters may be obtained based on $\widehat{X_i}$. For the normal distribution, these may be the sample mean and sample standard deviation of these values:

$$\hat{\mu} = \frac{1}{n}\sum_{i=1}^{n}\hat{X}_i$$

-continued $$\hat{\sigma} = \sqrt{\frac{\sum_{i=1}^{n}(\hat{X}_i - \hat{\mu})^2}{n-1}}$$

In an example, the termination criteria condition is met when a percentage change of the scale parameter/standard deviation is less than 0.01%) or until a predetermined maximum number of iterations (e.g., 5) is completed. Further a combination of termination criteria may be used. For example, an updated standard deviation estimate $\hat{\phi}_{new}$ may be compared to a previous estimate $\hat{\phi}_{old}$ and a termination rule $$\frac{|\sigma_{new} - \sigma_{old}|}{\sigma_{old}} \leq 0.0001$$

is used along with performing a maximum of 5 iterations.

Thus, process 500 repeats from step 510 using the new sample mean and the new sample standard deviation until the termination criteria condition is met. Upon meeting the termination criteria condition, a test such as the Anderson-Darling normality test may be performed on the final perturbed data and process 500 ends thereafter. Of course, these examples are not meant to be limiting as variations thereof may be achieved from descriptions herein.

Figure 6:
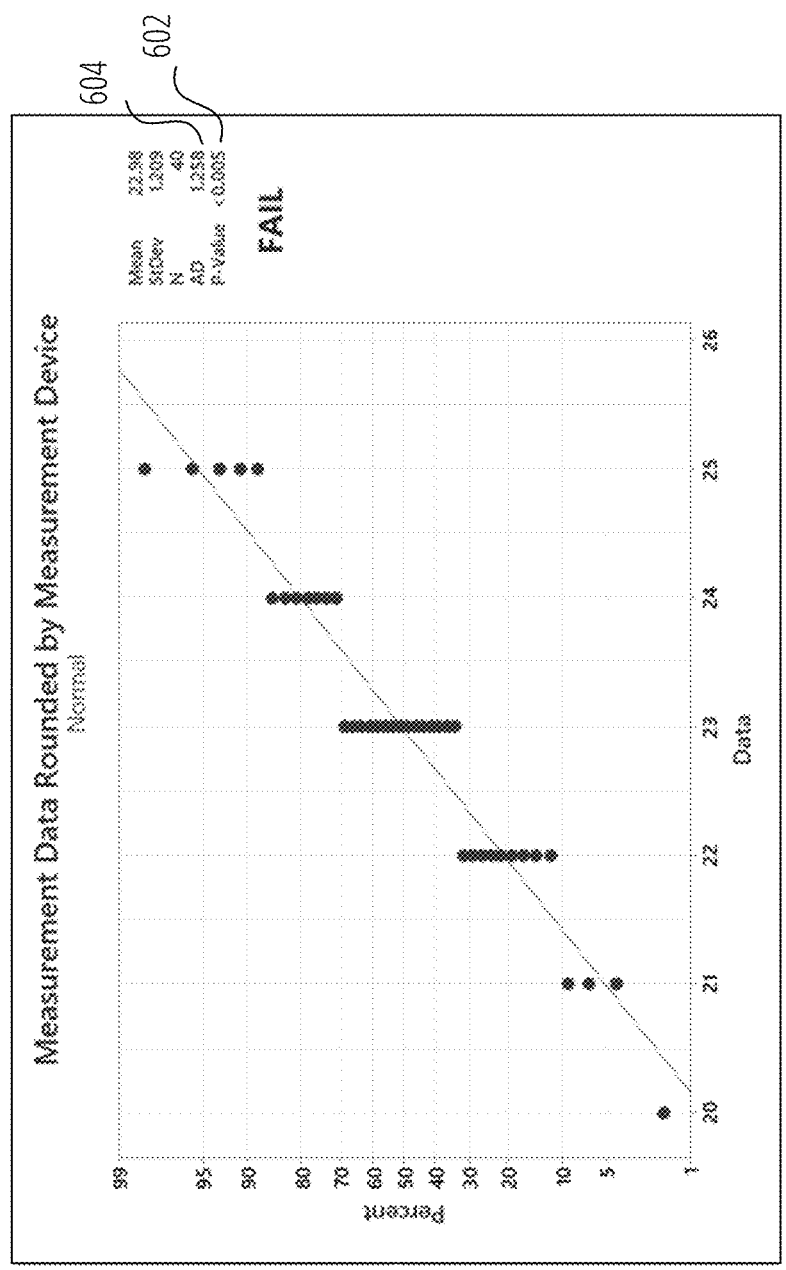
FIG. 6 depicts a plot illustrating a concept according to one or more illustrative embodiments.

FIG. 6 illustrates example measurements generated to simulate actual measurements seen from a medical device. The measurements/data form a random sample from a normally distributed population. While this data is known to come from a normally-distributed population, the null hypothesis that the data is from a normally-distributed population is rejected (P-value 602 of less than 0.005, with 0.05 being a threshold pass condition). A corresponding Anderson-Darling statistic 604 that results (1.258) is high. This failure result for a goodness-of-fit test for a continuous distribution may consistently occur for measurements sampled from that continuous distribution when the measurements are rounded because of poor measurement resolution.

Figure 7:
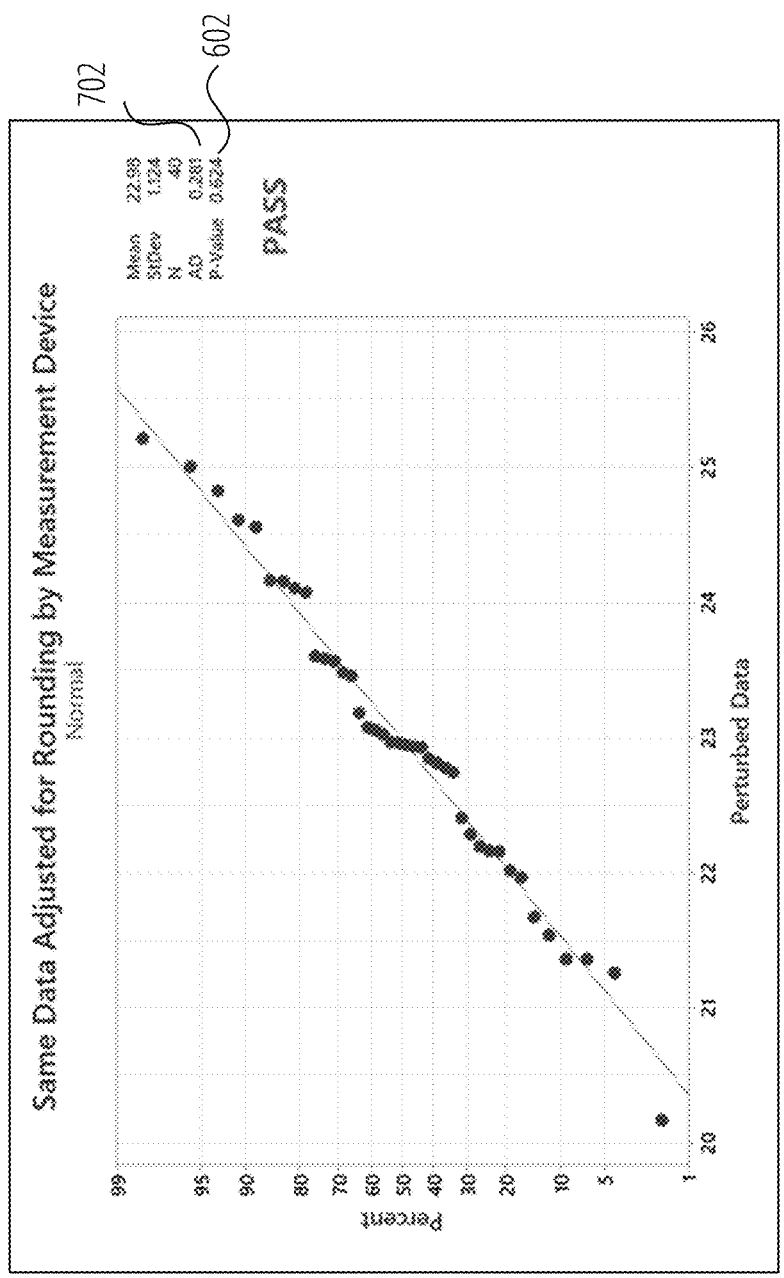
FIG. 7 depicts a plot illustrating a concept according to one or more illustrative embodiments.

FIG. 7 illustrates a plot with the same measurements from FIG. 6 being perturbed according to methods described herein. The null hypothesis that the measurements are from a normally-distributed population passes (P-value 602 of 0.624, with 0.05 being the threshold pass condition). A corresponding Anderson-Darling statistic 604 of the perturbed data is computed to be low (0.281).

Further, simulation studies were performed that may demonstrate problems associated with applying the Anderson-Darling test directly to low-resolution data and may further demonstrate the superior statistical properties attained by methods described herein. The simulations were performed based on sets of 2000 columns of generated data. In some cases, samples of data from the normal distribution are simulated. These are cases where the Anderson-Darling test should indicate that the normal distribution fits the data well in the vast majority of cases. Rounding of the data were carried out and varied to achieve different ratios of the rounding to the standard deviation of the data. In other cases, the Chi square methods were used to simulate non-normal data. These are cases where the Anderson-Darling test frequently is able to show a lack of fit of the normal distribution to the data. The results were then used to evaluate how the distribution of p-values for the rounded data with and without perturbation steps described herein compared to those obtained when the data are not rounded. For rounded data without our method, the distribution of p-values tends to be too low, which results in rejecting the normal distribution with too high a probability under the condition where the original data are normally distributed before rounding. This worsens as the rounding ratio increases. On the other hand, applying perturbation steps described herein results in the rounded data stabilizing the distribution of the p-values over a range of practical rounding ratios when the original data are from a normal distribution.

Figure 8:
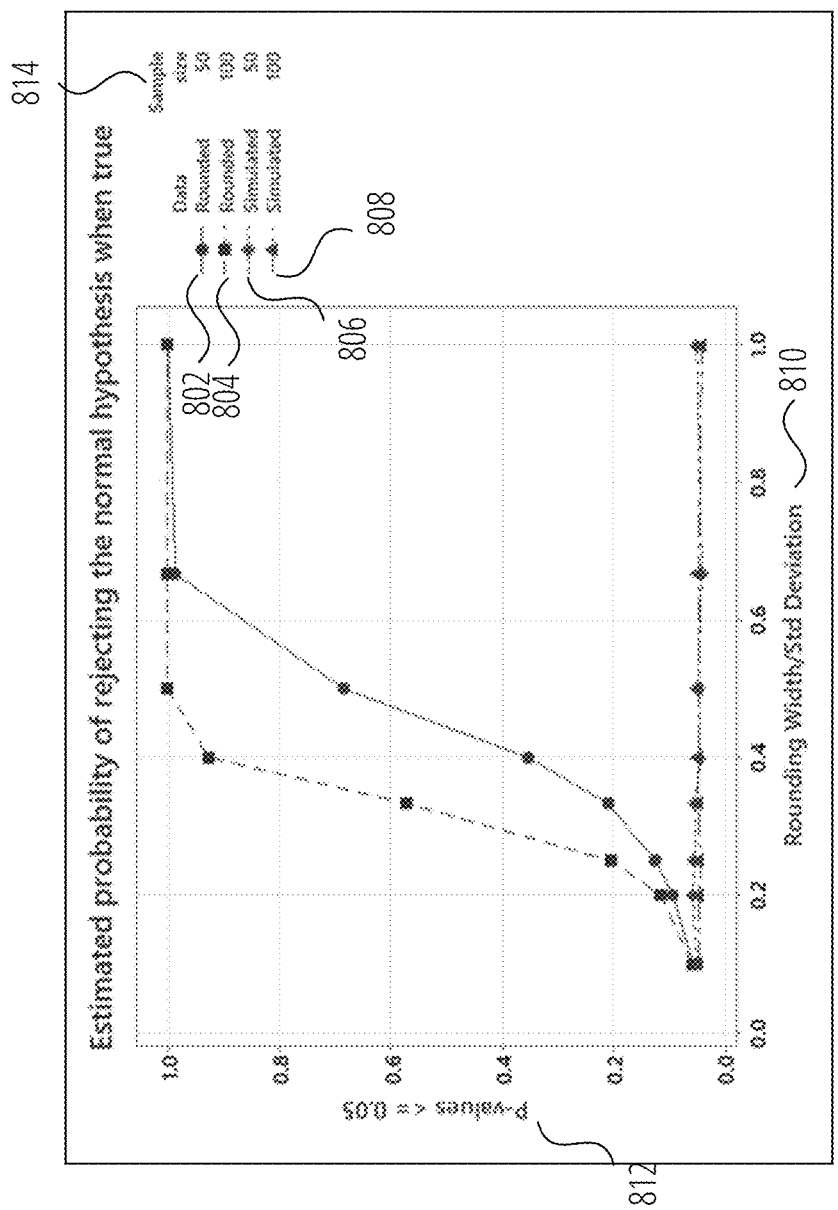
FIG. 8 depicts a plot illustrating a concept according to one or more illustrative embodiments.

More specifically, FIG. 8 shows an example wherein the measurement values are generated to follow a normal distribution. The figure illustrates tests for rounded values without perturbation-50 samples 802, rounded values without perturbation-100 samples 804, rounded values with perturbation-50 samples 806, and rounded values with perturbation-100 samples 808 having defined rounding ratios 810 (rounding width/standard deviation). For each defined ratio, the test is repeated a number of times (e.g., 2000 times) to find the percentage 812 of times the test incorrectly rejects the null hypothesis. As can be seen, introducing perturbation provides the rounded values with perturbation-50 samples 806 and the rounded values with perturbation-100 samples 808 with significantly less percentage 812 of times the test incorrectly rejects the null hypothesis (y-axis, i.e. proportion of times the test made a mistake) than the percentage of times the test incorrectly rejects the null hypothesis for rounded values without perturbation-50 samples 802 and rounded values without perturbation-100 samples 804. In other words, the more rounding, the worse the values without perturbation performs (approaches 100% with increased rounding), whereas the values with perturbation stays steady throughout the rounding.

Figure 9:
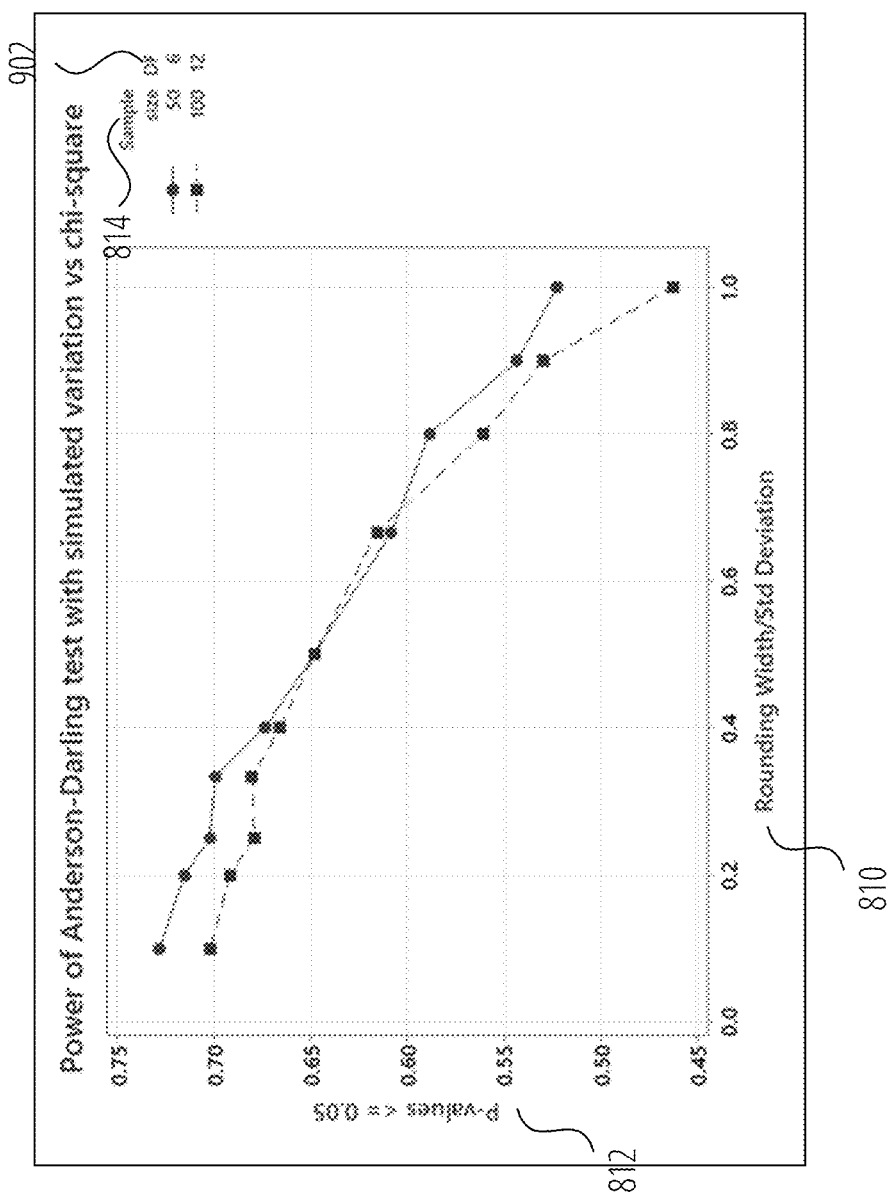
FIG. 9 depicts a plot illustrating a concept according to one or more illustrative embodiments.

FIG. 9 illustrates the power (ability to show that the data/measurement is not normal when it truly comes from a non-normal population) of the Anderson-Darling test in cases where the data is not generated to follow a normal distribution. In this case, the higher the percentage 812 of times the null hypothesis that the data follows a normal distribution is rejected, the better. A chi-square distribution with different defined degrees of freedom 902 and sample sizes 814 used. As can be seen, the perturbation provides sufficient "power" over the range of practical rounding ratios 810 considered, and power comparable to that of unrounded highest resolution data initially though it may gradually decline as the rounding ratio increases. This may be expected with the loss of information imposed by rounding.

Figure 10:
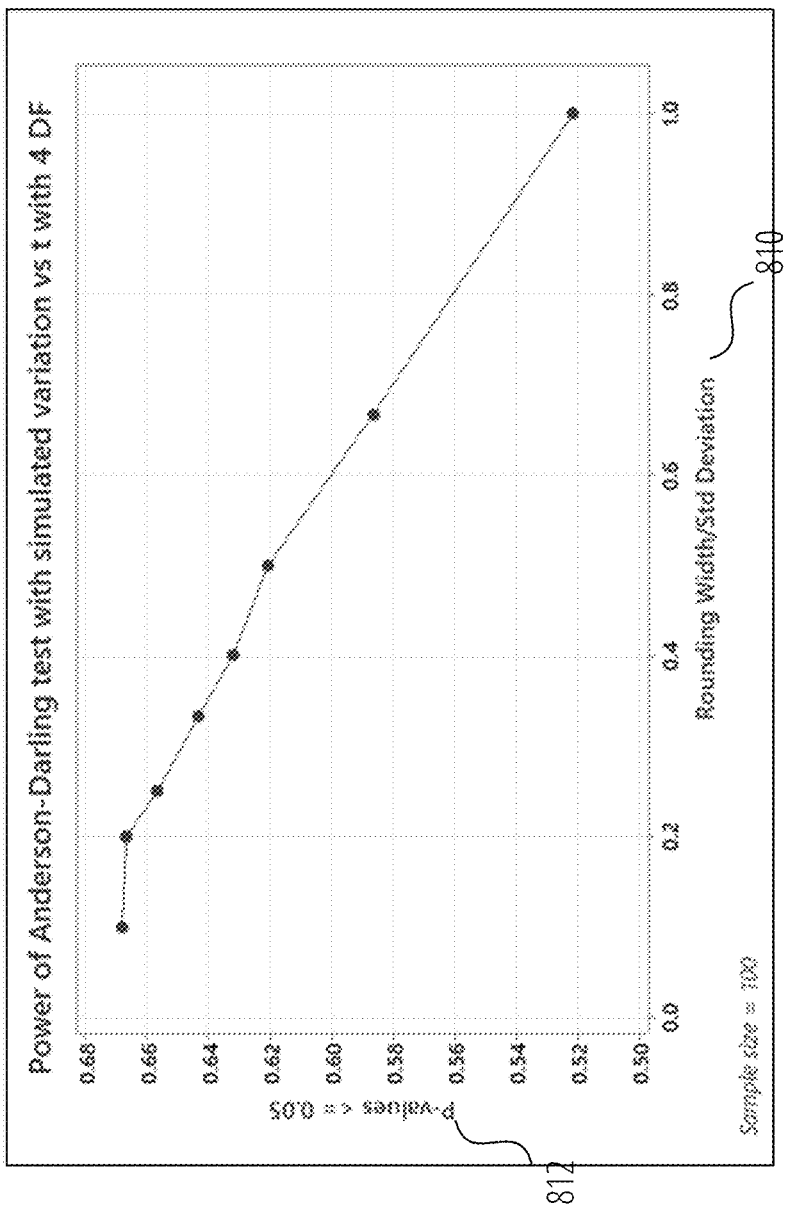
FIG. 10 depicts a plot illustrating a concept according to one or more illustrative embodiments.

FIG. 10 illustrates that the power of the Anderson-Darling test for a T-distribution with 4 degrees of freedom and sample size of 100 may also have a power that follows a similar trend as shown in the chi-square examples of FIG. 9. Thus, from these examples, it can be seen that the methods herein may provide reduced rejection when the data follows a normal distribution and increased rejection when the data/measurements do not follow a normal distribution.

Figure 11:
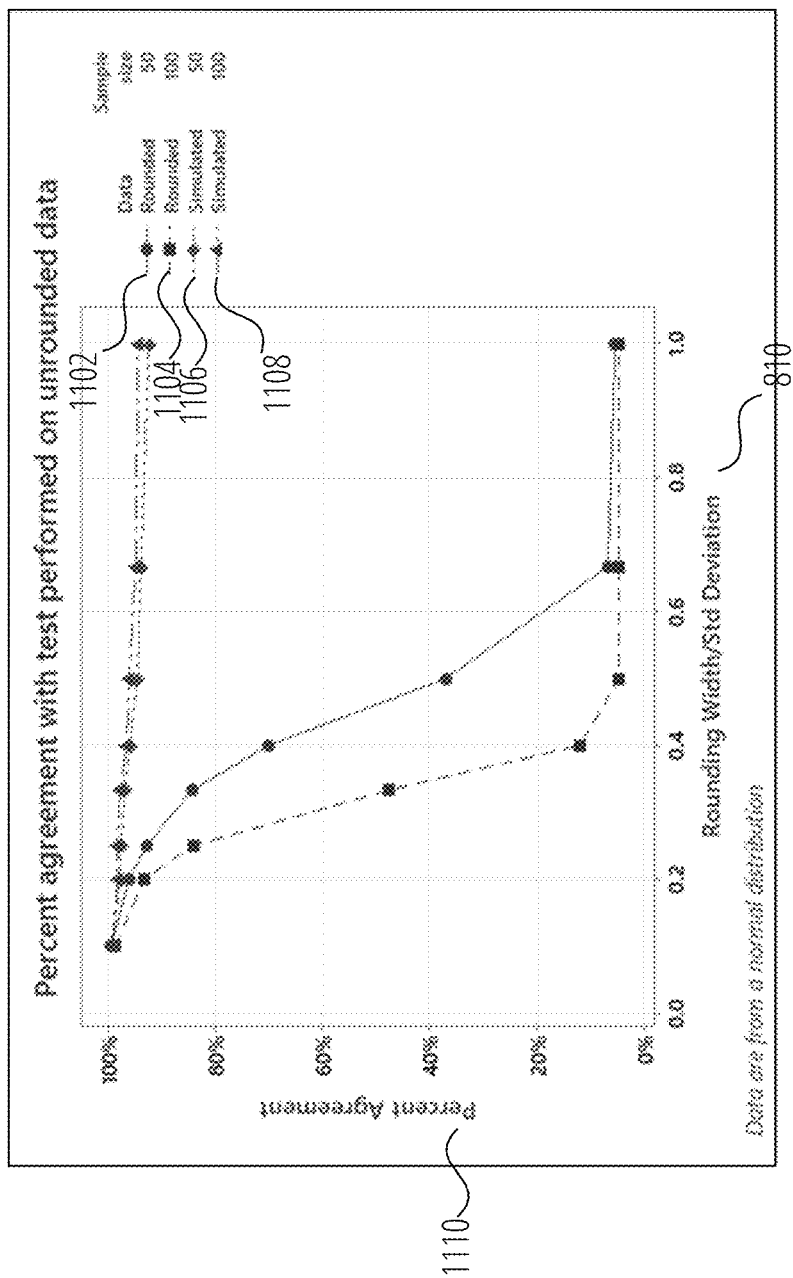
FIG. 11 depicts a plot illustrating a concept according to one or more illustrative embodiments.

FIG. 11 illustrates how well methods described herein perform or agree (percent agreement 1110) with the performance using full unrounded high-resolution data. Rounded values with perturbation-50 samples 1106 and rounded values with perturbation-100 samples 1108 provide performance comparable to having the unrounded high-resolution data whereas rounded values without perturbation-50 samples 1102 and rounded values without perturbation-100 samples 1104 provide poor performance with increasing rounding. The data were generated to follow a normal distribution. More specifically, methods described herein may be based on the idea of reintroducing some of the variation removed from the data by rounding. This may be done by means of randomly generated data. Thus, the result may also be random and may depend on the particular random data generated. Therefore, if the method were run again, the result may be different—possibly very similar, but not necessarily. The method carefully achieves this in a way that may preserve the distribution of the results one would get if the data were not rounded. This may be performed in a way that preserves as much of the specific information in the original data as is available. However, as the rounding ratio increases, the amount of information available about the complete data may diminish, and the variability of the results may increase. FIG. 11 thus shows how the p-values may relate to the complete-data p-values. In particular, FIG. 11 shows how often method discussed herein agreed with the original-data results concerning whether or not to reject the null hypothesis or normality.

Figure 12:
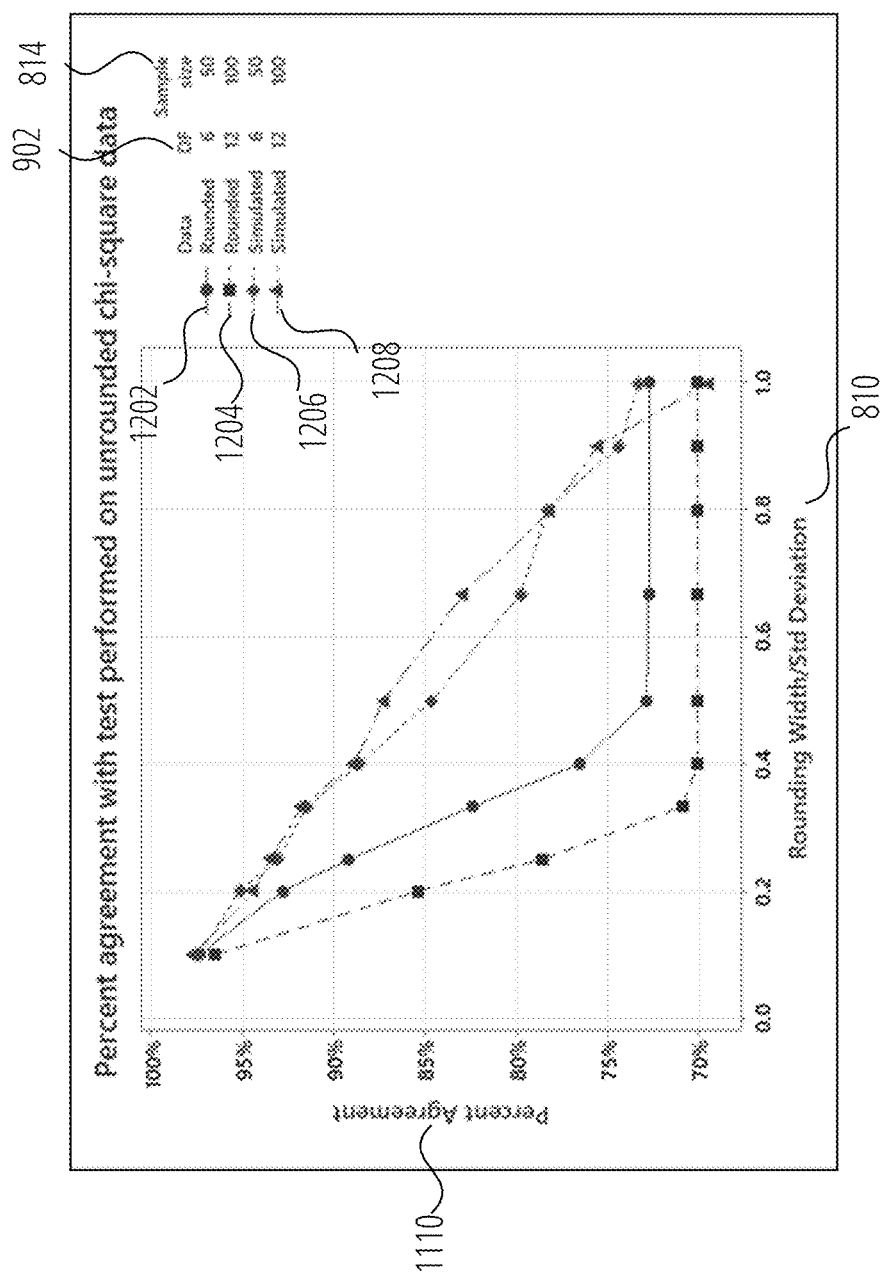
FIG. 12 depicts a plot illustrating a concept according to one or more illustrative embodiments.

FIG. 12 shows another example of the percent agreement 1110 wherein the data follows a non-normal distribution. Both sets of data were generated based on a chi-square distribution, but the degrees of freedom are varied to keep the power roughly the same as the number samples was varied. For 50 rows, 6 degrees of freedom are used and for 100 rows used 12 degrees of freedom are used. It can be seen that tests using rounded values with perturbation-50 samples-6 degrees of freedom 1206 and rounded values with perturbation-100 samples-12 degrees of freedom 1208 performed better than tests using rounded values without perturbation-50 samples-6 degrees of freedom 1202 and rounded values without perturbation-100 samples-12 degrees of freedom 1204. Moreover, percent agreement 1110 for 1206 and 1208 were still high at about 80% near 0.8 rounding and at about 70% with the highest rounding.

Figure 13:
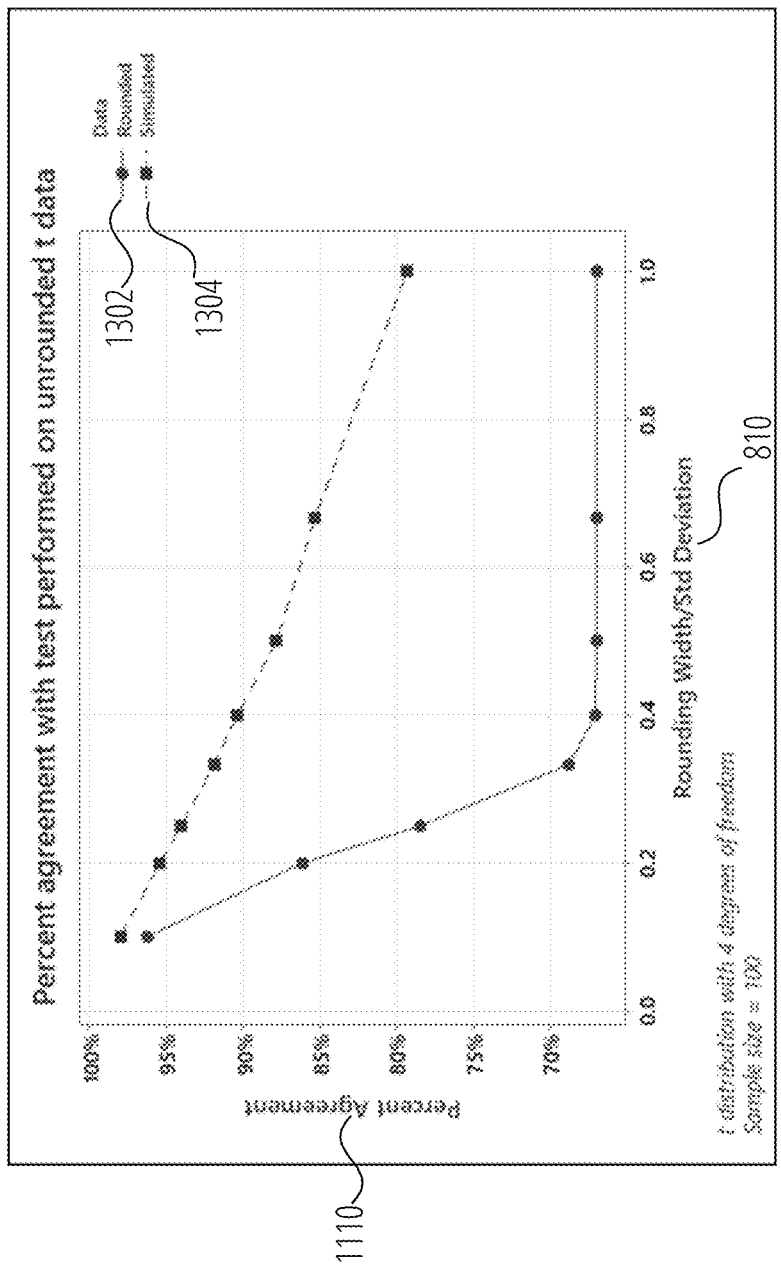
FIG. 13 depicts a plot illustrating a concept according to one or more illustrative embodiments.

FIG. 13 shows another comparison similar to that of FIG. 12 based on a T distribution with 4 degrees of freedom with 100 samples each. The figure shows tests using rounded values without perturbation-100 samples-4 degrees of freedom 1302 and rounded values with perturbation-100 samples-4 degrees of freedom 1304. For even moderately large rounding ratios, the 1302 will always reject, and hence all of the agreement is for sets where the original data also led to rejection of the null hypothesis. On the other hand, perturbation, as shown by 1304 continues to be more discriminating, and has better agreement with the full-resolution data even at the highest rounding ratio considered.

Of course, the examples of FIG. 8-FIG. 13 are examples and are not meant to be limiting for the methods described herein as other examples may be obtained in light of the descriptions herein.

Figure 14A:
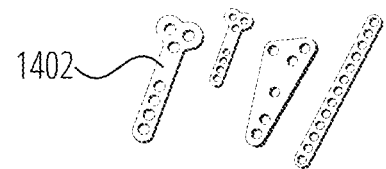
FIG. 14A depicts a device from which measurements are obtained in accordance with one or more illustrative embodiments.
Figure 14B:
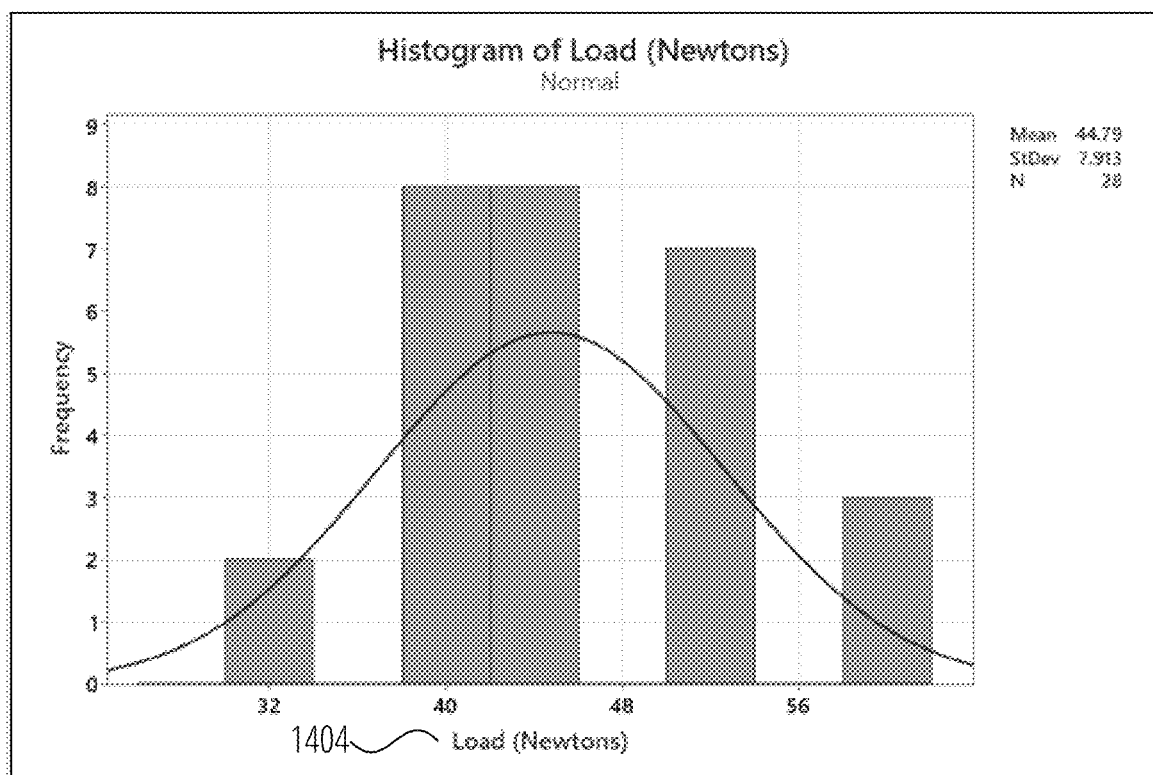
FIG. 14B depicts a plot in accordance with FIG. 14A.
Figure 14C:
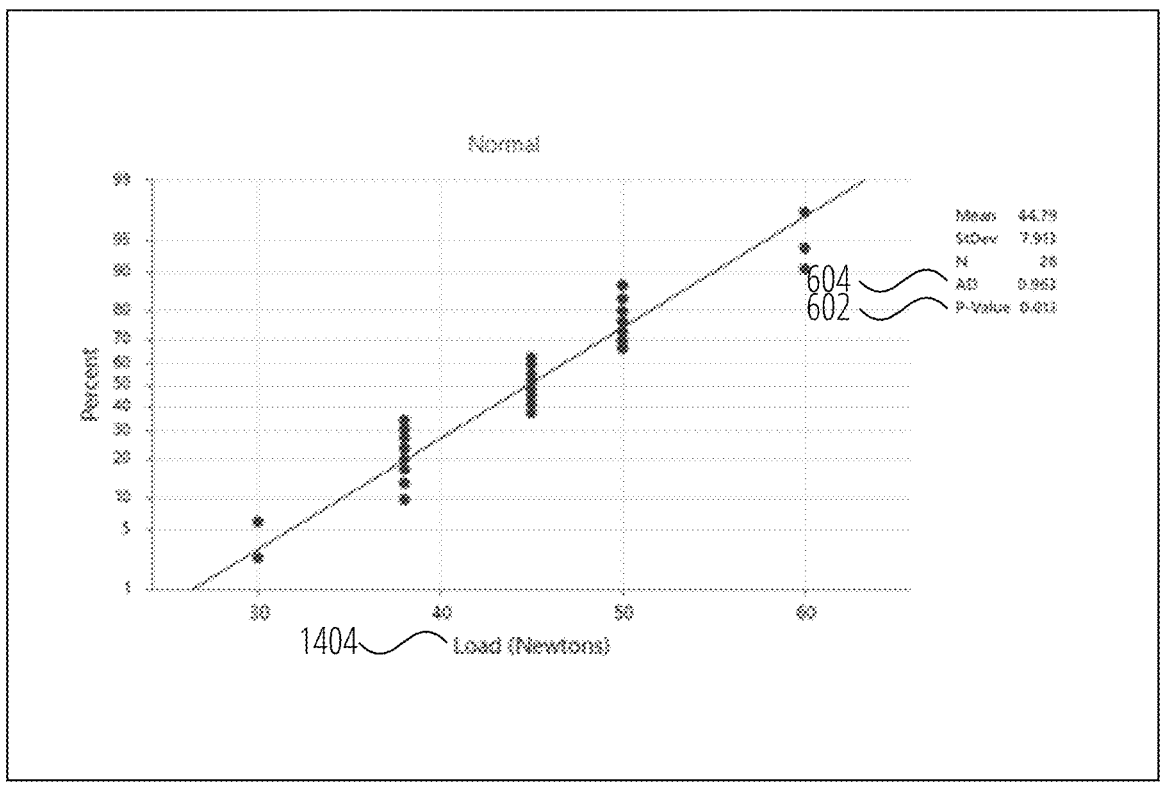
FIG. 14C depicts a plot in accordance with FIG. 14A.
Figure 14D:
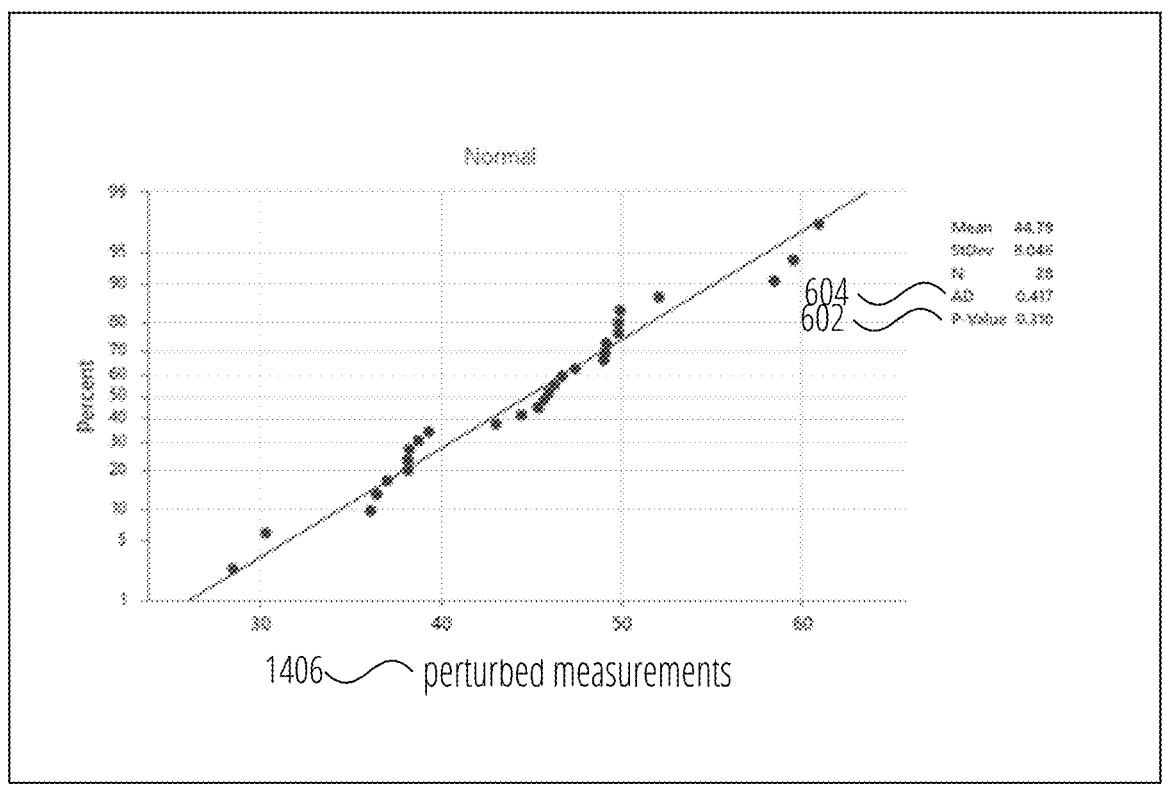
FIG. 14D depicts a plot in accordance with FIG. 14A.

In more use cases, a bend test for bone plates 1402 of FIG. 14A is shown by FIG. 14B-FIG. 14D. Bone plates are thin metal implants used to hold bone segments in the correct position while they heal after a break or other condition. A bone plate may be attached with screws to align and stabilize a broken bone. A variety of laboratory tests may be performed on bone plates to ensure their safety and efficacy. One such test, a static bend test, may apply increasing force to the bone plate until it breaks. Requirements may be set on the minimum force for which 99% of the population is expected to survive with 95% confidence. Before determining whether the reliability requirements are met, it may be necessary to determine the underlying distribution of the force measurements. It is common to assume that the forces required to break these bone plates follow a normal distribution. If the hypothesis test for normality concludes that the data is non-normal, the user may instead use a non-normal distribution or a distribution-free approach to demonstrate reliability. The resulting force measurements 1404, in Newtons, may be rounded because, for example, the testing machine may only apply specific levels of force. For a sample size of N=28, the histogram of FIG. 14B may indicate that the force measurements 1404 are reasonably symmetric and there isn't much evidence to suggest that they are non-normal. However, as shown in FIG. 14C, the p-value 602 for the Anderson-Darling Normality test (P=0.013) may reject the null hypothesis of normality and lead to the conclusion that these data are from a non-normal population (with 0.05 being the rejection threshold). Further the Anderson-Darling statistic 604 may be inflated, casting the conclusion of non-normality into doubt. By perturbing the force measurements 1404 into perturbed measurements 1406 a p-value 602 of 0.310 is obtained which may indicate that the null hypothesis of normality will no longer be rejected, and a normal distribution may be used when computing the necessary reliability estimates.

Figure 15A:
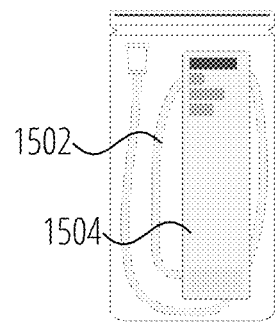
FIG. 15A depicts a device from which measurements are obtained in accordance with one or more illustrative embodiments.
Figure 15B:
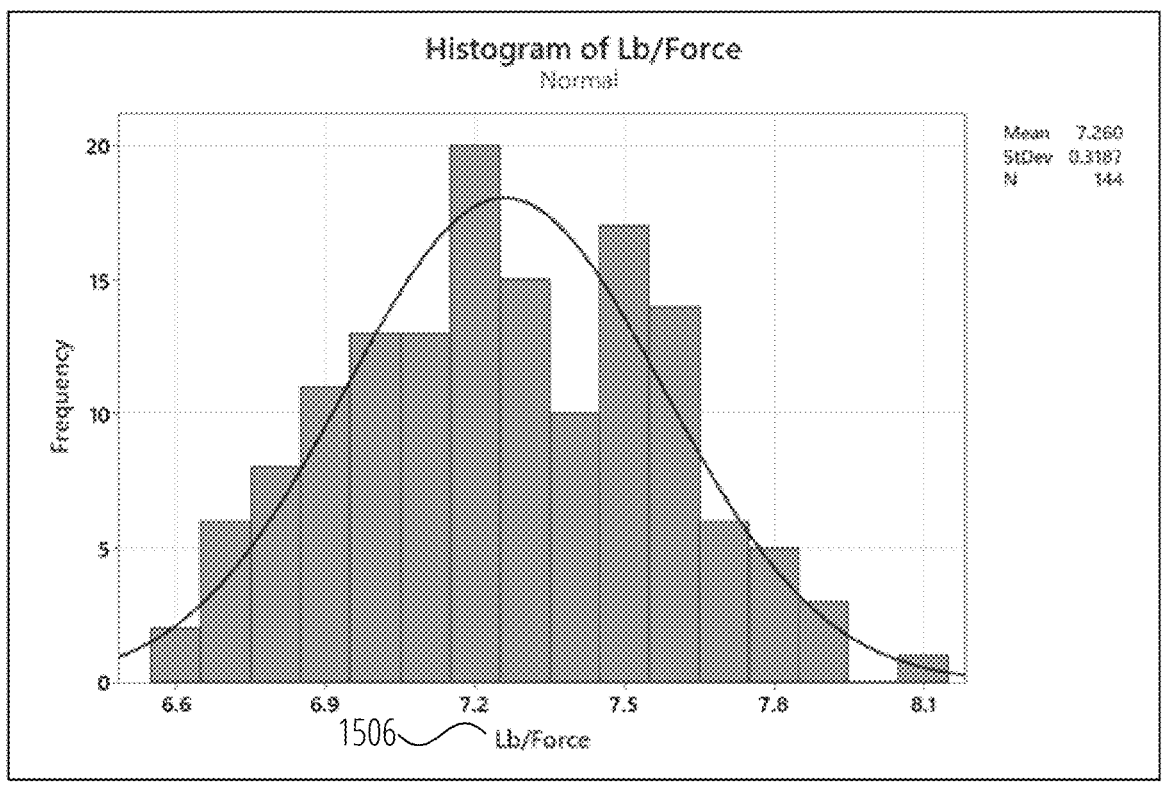
FIG. 15B depicts a plot in accordance with FIG. 15A.
Figure 15C:
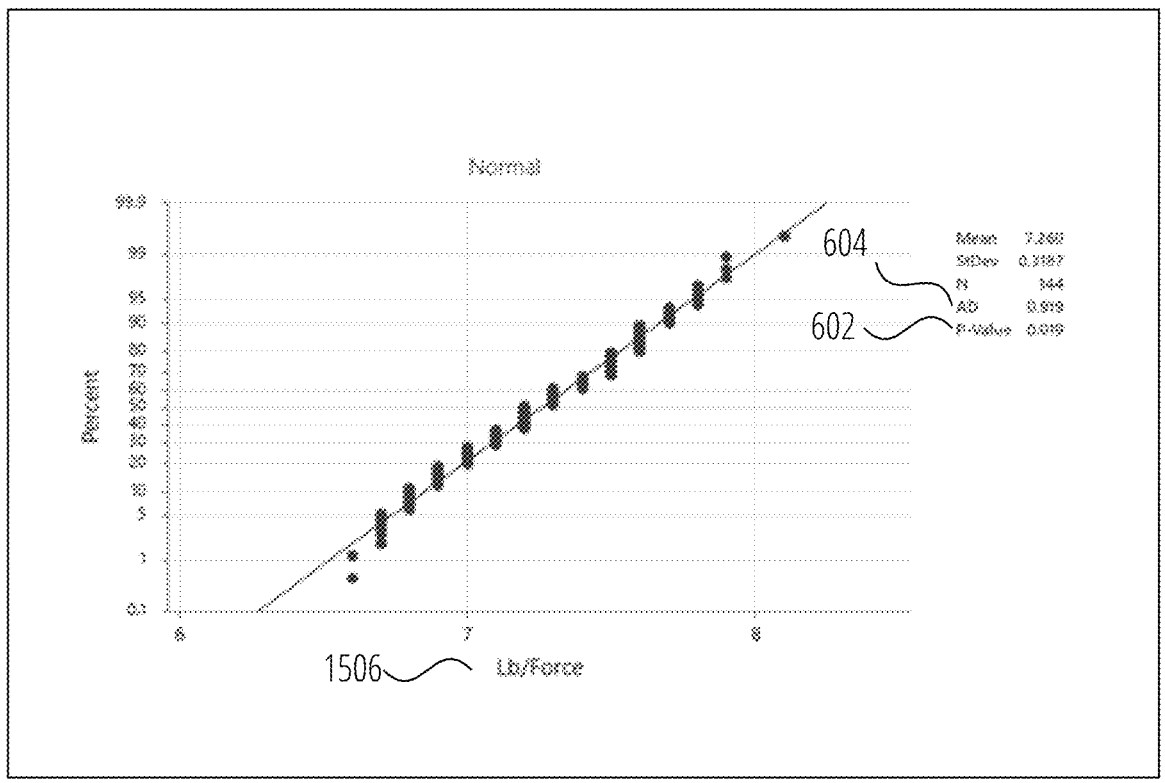
FIG. 15C depicts a plot in accordance with FIG. 15A.
Figure 15D:
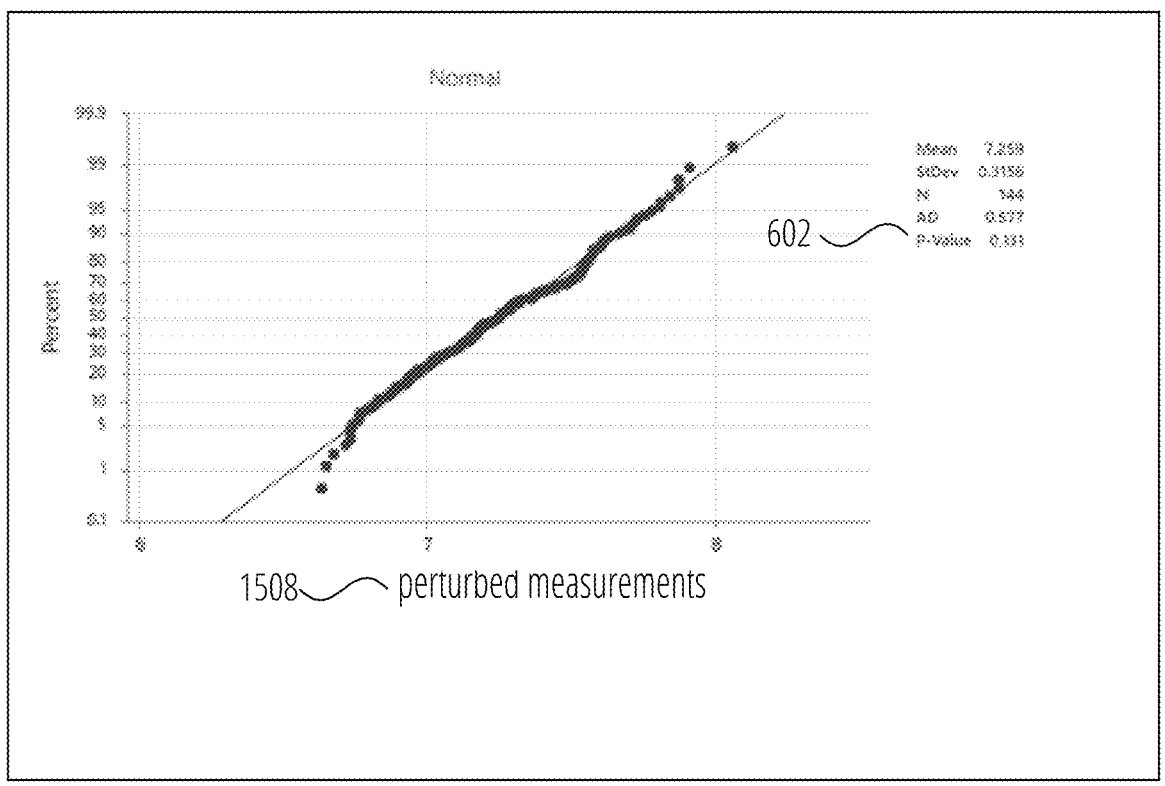
FIG. 15D depicts a plot in accordance with FIG. 15A.

In another use case, the seal strength for the packaging 1504 of urinary catheters 1502 may be highly regulated due to the risks associated with improper packaging. Catheters may be sterilized when packaged so they may be immediately used upon opening. The seal strength of the catheter packaging may be tested to ensure that the device remains sterile. Any section of the seal that is weak or compromised may provide an opportunity for entry of potential contaminants. Seal strength is the force required to remove the seal from the packaging. Force measurements 1506, in pound (force), as shown in FIG. 15B are typically rounded, making it difficult to determine the distribution of the underlying population. The population distribution may be critical for reporting statistics such as "Cpk" that determine the capability of the manufacturing process to meet desired specifications for seal strength. As shown in the histogram of FIG. 15B, there may be no evidence to suggest that these force measurements 1506 are from a non-normal population. However, the p-value 602 for the Anderson-Darling statistic (P-Value=0.019) suggests that the null hypothesis of normality should be rejected and concludes that the force measurement 1506 are non-normal. Because the data are rounded, however, the Anderson-Darling statistic 604 is inflated (0.919). This may make the measurements appear to be from a significantly non-normal population when they are not. By perturbing the measurements to correct the low resolution as shown in FIG. 15D, the p-value 602 of 0.131 suggests that the null hypothesis of normality is not inappropriately rejected.

Any specific manifestations of these and other similar example processes are not intended to be limiting to the invention. Any suitable manifestation of these and other similar example processes can be selected within the scope of the illustrative embodiments.

Thus, a computer implemented method, system or apparatus, and computer program product are provided in the illustrative embodiments for correcting low-resolution measurements and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser, or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a dedicated measurement system 124 or user's computer, partly on the user's computer or measurement system 124 as a stand-alone software package, partly on the user's computer and partly on a remote computer or entirely on the remote computer or server, etc. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

What is claimed is:

1. A method comprising:
measuring, using a low-resolution measurement device containing at least one sensor, a plurality of low-resolution measurements in a manufacturing process; the plurality of low-resolution measurements being quantitative measurements corresponding to a plurality of unobservable high-resolution measurements;
introducing variation in the plurality of low-resolution measurements by iteratively computing, until a termination criteria is met, corresponding perturbed values for the low-resolution measurements, said corresponding perturbed values having a higher resolution than the resolution of the low-resolution measurements; and
running, responsive to the introducing, a distribution test on final perturbed values that remain after said termination criteria is met
wherein the introducing comprises:
computing, for each low-resolution measurement, a first interval that contains a corresponding unobservable high-resolution measurement corresponding to said each low-resolution measurement;
generating, for each low-resolution measurement, a random observation from a uniform distribution on a defined interval;
transforming each random observation to be uniform on a second interval that corresponds to a distribution function of the first interval to obtain corresponding rescaled uniform observations, said distribution function being based on estimated distribution parameters of said low-resolution measurements; and
inverse transforming, responsive to the transforming, and using an inverse of the distribution function, said rescaled uniform observations to obtain said corresponding perturbed values,
wherein the transforming and inverse transforming are repeated iteratively using new estimated distribution parameters of the corresponding perturbed values until said termination criteria is met.

2. The method of claim 1, wherein the first interval is computed based on a range of possible values of the unobservable high-resolution data.

3. The method of claim 1, wherein the distribution function is a cumulative distribution function.

4. The method of claim 1, wherein the unobservable high-resolution measurements are tested for normality and the estimated distribution parameters are a mean and a standard deviation.

5. The method of claim 4, wherein the estimated distribution parameters are a sample mean and a sample standard deviation of the low-resolution measurements and the new estimated distribution parameters are a new sample mean and a new sample standard deviation of the corresponding perturbed values.

6. The method of claim 1, wherein the low-resolution measurements are rounded versions of the unobservable high-resolution measurements.

7. The method of claim 1, wherein the termination criteria is a stable standard deviation condition.

8. The method of claim 1, wherein the distribution test is an Anderson-Darling test.

9. The method of claim 8, wherein the Anderson-Darling test tests for normality.

10. The method of claim 1,
wherein the low-resolution measurement device is selected from one or more of a medical device, a vision and imaging device, a detector, and a transducer.

11. The method of claim 10, wherein the values of a defined property are quantitative values.

12. A non-transitory computer readable storage medium storing program instructions which, when executed by a processor, causes the processor to perform a procedure comprising the steps of:
measuring, using a low-resolution measurement device containing at least one sensor, a plurality of low-resolution measurements in a manufacturing process, the plurality of low-resolution measurements being quantitative measurements corresponding to a plurality of unobservable high-resolution measurements;
introducing variation in the plurality of low-resolution measurements by iteratively computing, until a termination criteria is met, corresponding perturbed values for the low-resolution measurements, said corresponding perturbed values having a higher resolution than the resolution of the low-resolution measurements; and
running, responsive to the introducing, a distribution test on final perturbed values that remain after said termination criteria is met
wherein the program instructions further cause the processor to perform the introducing by:
computing, for each low-resolution measurement, a first interval that contains a corresponding unobservable high-resolution measurement corresponding to said each low-resolution measurement;
generating, for each low-resolution measurement, a random observation from a uniform distribution on a defined interval;
transforming each random observation to be uniform on a second interval that corresponds to a distribution function of the first interval to obtain corresponding rescaled uniform observations, said distribution function being based on estimated distribution parameters of said low-resolution measurements; and
inverse transforming, responsive to the transforming, and using an inverse of the distribution function, said rescaled uniform observations to obtain corresponding perturbed values,
wherein the transforming and inverse transforming are repeated iteratively using new estimated distribution parameters of the corresponding perturbed values until said termination criteria is met.

13. The non-transitory computer readable storage medium of claim 12, wherein the distribution test is an Anderson-Darling test.

14. A computer system comprising:

at least one processor configured to performs:

measuring, using a low-resolution measurement device containing at least one sensor, a plurality of low-resolution measurements in a manufacturing process; the plurality of low-resolution measurements being quantitative measurements corresponding to a plurality of unobservable high-resolution measurements;

introducing variation in the plurality of low-resolution measurements by iteratively computing, until a termination criteria is met, corresponding perturbed values for the low-resolution measurements, said corresponding perturbed values having a higher resolution than the resolution of the low-resolution measurements; and running, responsive to the introducing, a distribution test on final perturbed values that remain after said termination criteria is met wherein the at least one processor is configured to perform the introducing step by:

computing, for each low-resolution measurement, a first interval that contains a corresponding unobservable high-resolution measurement corresponding to said each low-resolution measurement;

generating, for each low-resolution measurement, a random observation from a uniform distribution on a defined interval;

transforming each random observation to be uniform on a second interval that corresponds to a distribution function of the first interval to obtain corresponding rescaled uniform observations, said distribution function being based on estimated distribution parameters of said low-resolution measurements; and inverse transforming, responsive to the transforming, and using an inverse of the distribution function, said rescaled uniform observations to obtain corresponding perturbed values, wherein the transforming and inverse transforming are repeated iteratively using new estimated distribution parameters of the corresponding perturbed values until said termination criteria is met.

15. The computer system of claim 14, wherein the low-resolution measurements are rounded versions of the unobservable high-resolution measurements.

16. The computer system of claim 14, wherein the distribution test is an Anderson-Darling test.

17. The non-transitory computer readable storage medium of claim 12, wherein the low-resolution measurements are rounded versions of the unobservable high-resolution measurements.

18. The computer system of claim 14, wherein the low-resolution measurement device is selected from one or more of a medical device, a vision and imaging device, a detector, and a transducer.

19. The non-transitory computer readable storage medium of claim 12, wherein the low-resolution measurement device is selected from one or more of a medical device, a vision and imaging device, a detector, and a transducer.

* * * * *